Patented Feb. 23, 1932

1,847,023

UNITED STATES PATENT OFFICE

EUGENE STAEGEMANN, OF OAKWOOD, OHIO, ASSIGNOR, BY MESNE ASSIGNMENTS, TO THE DAYTOL COMPANY

WATER SOLUBLE SULPHONIC ACID OF THE UNSATURATED HYDROCARBONS OF OILS FOR USE AS A PROTEIN PRECIPITATOR

No Drawing.   Application filed October 24, 1927.   Serial No. 228,509.

This invention relates to a new and useful method of precipitating proteins in a new and useful manner.

It is the principal object of my invention to precipitate proteins or impurities partaking the nature of proteins, which are held in solution, suspension or in colloidal dispersion, in crude or mother liquors, and by precipitating these proteins in a simple and effective manner, materially reduce the cost of production or treatment of a number of important commodities or products, substantially enumerated hereinafter.

It is known that these protein bodies are found in the crude or mother liquors of sugar cane juice, beet sugar liquor and in the extractable liquors of all animal and vegetable substances. It is known that ferments, bacteria and other forms of living organisms are essentially composed of proteins. It is known that proteins are endowed with a positive charge of electricity in acid solution as can be demonstrated by their migration to the cathode when an electric current is passed through a solution containing them and by other manifestations well known in the science of colloidal chemistry. It is also known that the untreated crude or mother liquors obtained from sugar cane, beet sugar and other vegetable matter are normally of acid reaction and that the products of fermentation and decay are acid in character. It is known that the waste products of the body are acid and that sewage and other effluvial matter is also of acid reaction.

I have discovered that these proteins are precipitated by a certain colloid, described particularly hereinafter, carrying a negative electric charge in acid solutions as is demonstrated by its migration to the anode when an electric current is passed through its solution. My discovery makes possible commercial applications in industry, and in sanitation, requiring precipitation of protein matter from solution, thus resulting in a saving of materials, labor and time.

In the art of refining materials requiring the removal of protein matter or in the precipitation of effluvial and bacteria in sewage, I first prepare a negatively charged colloid; i. e. one which will migrate to the anode in a solution placed in an electric field. The colloid I prefer to use for this work can be made in the following manner, viz: Take a quantity of an oil (asphalt base preferred) that contains a substantial amount of unsaturated compounds, add about an equal amount of sulphuric acid, heat the mixture gently to about 80 degrees C. with agitation or the mixture can be agitated in the cold allowing greater time for the reaction. After about an hour the products of sulphonation are dumped into a volume of water of about equal capacity and allowed to cool for several hours. A thick layer, intermediate between an acid layer below and an oil layer above is formed. The thick layer, as made above, is dissolved in about an equal volume of water and allowed to stand for some time whereupon any uncombined oil separates and a perfectly water soluble compound, of acid reaction and negatively charged, results. This water soluble compound is dark black-green in color. It is an exceedingly complex compound or mixture of unknown constitution and is held in colloidal dispersion as is demonstrated not only by the fact that it will migrate in an electric field but also because it will not dialyze. It also exhibits other characteristics well known in colloid chemistry. I have discovered that this colloid, as prepared above, will react instantly with neutral or acid gelatine or albumin in the cold, and with a number of other proteins, either in the cold or when the mixture is heated, forming an insoluble precipitate of varying density depending upon the concentrations. My hypothesis of this reaction between the protein and the colloid, as prepared above, is that the protein particle, which carries a positive charge in acid solution, attracts or absorbs, the negatively charged colloid, I have prepared as above, resulting in the formation of another compound particle or group so large that it passes out of the colloid realm into a coarsely dispersed phase which precipitates out of solution.

In the art of refining sugar, or other materials requiring the removal of protein matter and in the purification of sewage or other septic solutions, I prefer to add a suitable amount of my protein precipitator, as made above, determinated by experiment, to the neutral or acid solution, and, after agitation, to allow the precipitate to settle out in tanks or to pass the solution through a suitable filter. The liquid recovered after treatment is substantially free from protein matter. Some proteins, such as are found in the cane or beet sugar industry, can be more quickly precipitated by the addition of a small amount of gelatine or albumin to the liquor before adding my protein precipitator.

Before my discovery and invention, protein separation involved a number of steps, such as acid treatment, alkaline treatment, the application of heat, treatment with charcoal and other steps depending upon the character of the protein to be removed. It is well known in the art of refining that these protein bodies are difficult to remove and that their removal constitutes an important item of expense which is reflected in the cost of the finished product. Furthermore, fermentable liquors require prompt treatment to prevent the ferments and other low forms of life, from creating undesirable reactions which reduce the quality and yield of the finished product. Through the use of my discovery and invention, as set forth above, it is possible to effect a considerable saving in materials, labor and time by the easy precipitation of these proteins, thus resulting in a lower cost of the finished product. The low cost of producing my protein precipitator enables its use in the commercial application of all industries requiring the removal of these protein bodies as an essential step in their processes. My invention also makes possible the economical treatment of sewage and other effluvial solutions, resulting in the precipitation not only of the inanimate proteins, but also of the bacteria, which chemically are merely aggregates of protein.

I claim as my invention:

A protein precipitator for removing protein matter from acid solutions made by taking a quantity of oil having an asphalt base containing a substantial amount of unsaturated hydrocarbons, adding an equal quantity of sulphuric acid, agitating the mixture, pouring the same thereafter in a volume of water of equal capacity and allowing the same to settle whereby the same will divide into an upper oil layer, an intermediate thick layer and a lower acid layer, removing said intermediate thick layer and dissolving the same in an equal quantity of water to remove any uncombined oil therefrom, whereby a water soluble compound or colloid of acid reaction and negative electric charge results.

In testimony whereof I have hereto set my hand this 28th day of July, A. D. 1927.

EUGENE STAEGEMANN.